United States Patent [19]

Armbruster et al.

[11] Patent Number: 5,808,375
[45] Date of Patent: Sep. 15, 1998

[54] METHOD OF OPERATING AN ELECTRICAL CONTROL SYSTEM FOR AN AUTOMOTIVE VEHICLE HAVING A SERVICE-FACILITY MODE

[75] Inventors: Stefan Armbruster, Essen; Bettina Gottwald nee Heinze; Achim Jahrsetz, both of Velbert; Wilfried Ostermann, Essen; Thomas Schönenberg, Leverkusen; Fred Welskopf, Herne, all of Germany

[73] Assignee: Kiekert AG, Heiligenhaus, Germany

[21] Appl. No.: 652,715

[22] Filed: May 30, 1996

[30] Foreign Application Priority Data

Aug. 18, 1995 [DE] Germany .................. 195 30 719.4

[51] Int. Cl.⁶ .................................................. B60R 25/10
[52] U.S. Cl. ...................... 307/10.2; 307/10.4; 307/10.5; 180/287; 70/256
[58] Field of Search ............................. 70/264, 255, 256, 70/257, 258; 180/289, 287; 224/419; 307/9.1–10.8, 141; 340/426, 430, 438, 540–542, 545, 825.31, 825.32, 825.34, 825.5; 364/423.098, 423.099, 424.026, 424.037, 424.045, 424.059

[56] References Cited

U.S. PATENT DOCUMENTS

| 4,205,325 | 5/1980 | Haygood | 361/172 |
|---|---|---|---|
| 4,240,516 | 12/1980 | Henderson | 180/289 |
| 4,437,153 | 3/1984 | Kamiyama | 340/825.31 |
| 4,477,874 | 10/1984 | Ikuta | 340/825.31 |
| 4,719,460 | 1/1988 | Takeuchi | 340/825.31 |
| 4,733,100 | 3/1988 | Nusairat et al. | 307/141 |
| 4,866,433 | 9/1989 | Akutsu | 340/825.31 |
| 5,216,406 | 6/1993 | Bechtle | 340/426 |
| 5,248,898 | 9/1993 | Periou | 307/10.1 |
| 5,250,849 | 10/1993 | Periou | 307/10.1 |
| 5,272,386 | 12/1993 | Kephart | 307/141 |
| 5,307,048 | 4/1994 | Sonders | 340/426 |
| 5,543,776 | 8/1996 | L'Esperance | 340/426 |

FOREIGN PATENT DOCUMENTS 41 41 504 A1   8/1992   Germany .

*Primary Examiner*—Jeffrey A. Gaffin
*Assistant Examiner*—Peter Ganjian
*Attorney, Agent, or Firm*—Herbert Dubno

[57] ABSTRACT

An electrical control system for an automotive vehicle can be switched to a service facility operating mode in which locks for the glove compartment, a storage console and the trunk can be inactivated in their closed position while other electrically-operated vehicle locks remain operable by actuators of the control system to prevent access to personal belongings by service personnel. Restoration to the normal operating mode can be effected automatically upon lapse of a time period programmed into the central unit.

7 Claims, 1 Drawing Sheet

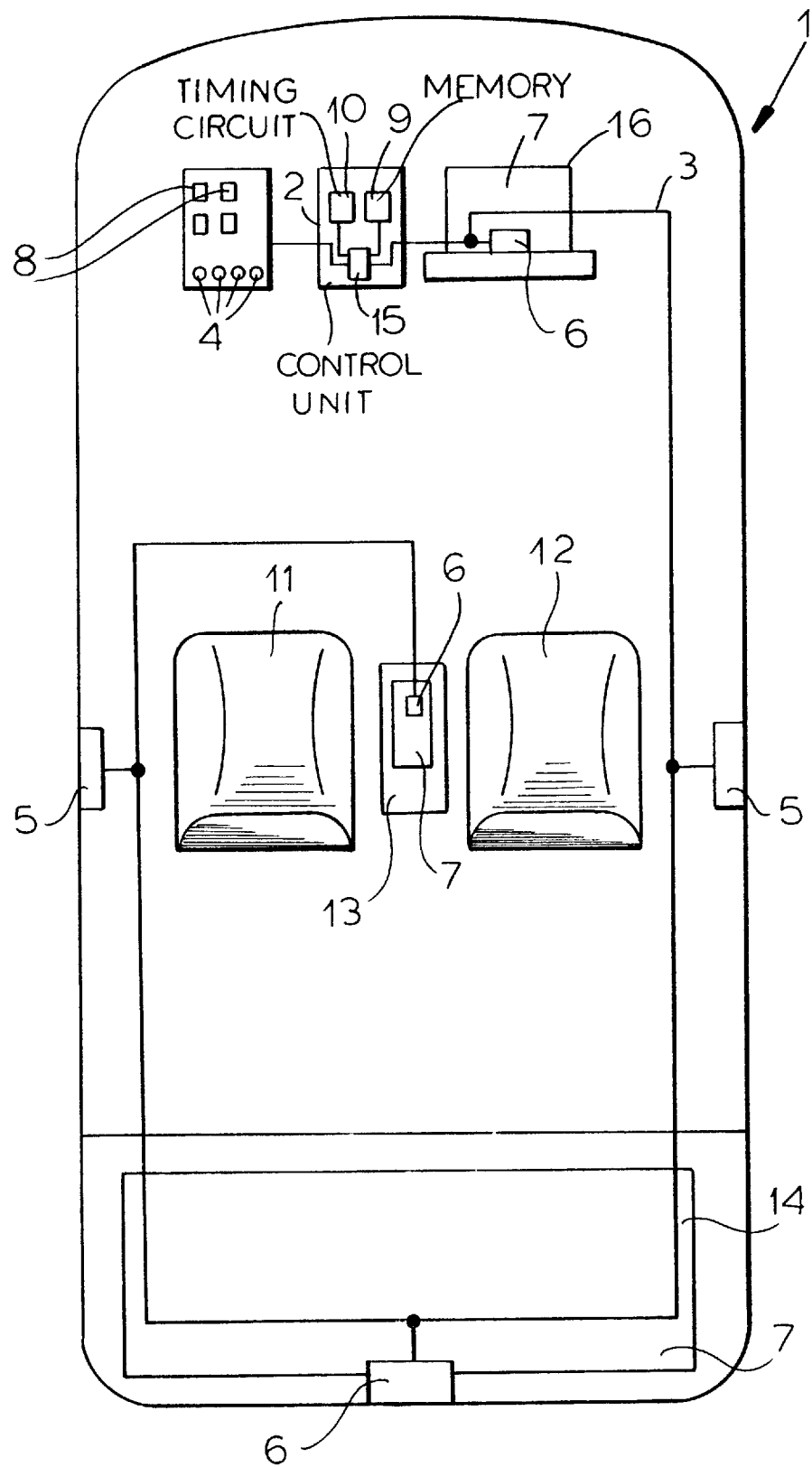

METHOD OF OPERATING AN ELECTRICAL CONTROL SYSTEM FOR AN AUTOMOTIVE VEHICLE HAVING A SERVICE-FACILITY MODE

FIELD OF THE INVENTION

Our present invention relates to a method of operating an electrical control system for a motor vehicle having a service-facility mode and to a control system with such a mode.

BACKGROUND OF THE INVENTION

Electrical control systems for motor vehicles may comprise a vehicle control unit which is electrically connected by signal transmission lines to electrically-operable vehicle components which may be provided with electrical actuators for operating the components through the control system.

In the usual case, the electrically-operable vehicle components can include vehicle door locks and, where the control system operates the locks of the vehicle, at least one lock for a privacy zone for the vehicle. The privacy zone of the vehicle can be a trunk, glove compartment and any other compartments or spaces in which personal belongings may be stored and which, when locked, are intended to prevent access by unauthorized personnel who may have to have access to other locks for the service of the vehicle.

A control system of the type with which the invention is concerned is, as a rule, an electronic system which may have a central processor which can be actuated by a remote control or by a key or push button system on the vehicle and may also be equipped with peripherals like memories, displays, etc. When a central processor is used, the control unit may be program-operated.

While the signal transmission system may be discrete analog control lines connecting the central unit with the servers, it can also be a parallel bus or a multiplex single conductor bus. In the latter case, the return may be the chassis ground. A multiplex single-conductor bus provides a single line as the control signal carrier. For electrically-controlled components of the vehicle, however, additionally a current supply line may be provided for supplying the electrically-operable vehicle components with electrical energy from, for example, the battery of the vehicle. In this case, the opposite pole may be formed by the chassis as well.

When reference is made herein to electrically-controllable or electrically-operated vehicle components, we can include purely electrical components like lamps and other lighting components, especially internal lighting elements.

Electrically-controllable vehicle components can also include electromechanical components in which mechanical functions may be initiated, controlled or effected by electrically controllable effectors such as solenoids or motors. Among these latter components are vehicle door locks, sliding sun roofs, window lifters, mirror adjusting drives, seat-adjusting drives, hood closures, glove compartment closures, trunk closures, fuel tank closures and the like.

Among the electrically-operated vehicle components, there are also devices involved in the operation of the engine and vehicle, such as motor control, transmission control and like elements.

The control system should make available for the vehicle door locks, functions or modes such as "locking and unlocking", "antitheft mode on" and "antitheft mode off" and functions like "open" and "closed."

As a rule the control system can have, apart form other functions, substantially invariably the function of a central locking system.

It has already been mentioned that a vehicle may have regions which should be secure against undesired access, i.e. so-called privacy zones, in which personal articles of authorized individuals can be stored and kept, and which can be provided with flaps, covers or other closures which may have to be secured against access to unauthorized individuals.

Examples of privacy zones in an automobile include, for example, the glove compartment, the central storage console frequently located between two front seats of the vehicle and, of course, the trunk or "boot." Electrical service elements or effectors for operating the electrical components and/or the locks described can be connected via electrical conductors with the control unit and operated by push buttons or switches in the interior of the vehicle or by a remote controller which can be in wireless communication with the control unit via light waves or radio waves.

In a common system, however, the control unit includes a microprocessor, the signal lines are formed by a multiplex single-conductor bus, the servers at the locks, closures or other electrically-operated units include satellite processors connected to the multiplex bus and electromagnetic effectors like solenoids and electric motors.

One system for providing electrical operation of components of the motor vehicle is described in German patent document DE 41 41 504 A1 which does not permit deactivation, however, of the closure of the privacy zone locks independently of the vehicle door locks.

When a motor vehicle is brought to a service station, service personnel must have the possibility of access to the vehicle for maintenance and repair purposes and this means that they must be capable of locking and unlocking the door locks. In the past, because of the functional connection between the door lock system and the closures for the privacy zones, the latter also remained accessible to service personnel in such establishments. As a result, there always was the possibility that individuals present in or having access to service facilities might also, although unauthorized, have access to the personal belongings in the privacy zone. A so-called service facility operational mode was not possible with earlier electrically-operated systems of the type described although with the use of key locks, of course, it was possible to exclude access to privacy zones by simply not making keys for those zones available to service station personnel.

OBJECTS OF THE INVENTION

It is, therefore, the principal object of the present invention to provide an improved method of operating an electrical control system whereby the aforedescribed problems can be solved and a work facility mode can be provided which can exclude, in a simple and reliable manner, access to privacy zones of the vehicle.

Another object of this invention is to provide an improved electrical system for operating electrical components of a motor vehicle which can have a work facility mode without requiring additional mechanical components.

Yet another object of the invention is to provide an improved method of and control system for operating or controlling electrical components of a motor vehicle whereby disadvantages of earlier systems are avoided.

SUMMERY OF THE INVENTION

These objects and others which will become apparent hereinafter are attained, in accordance with the invention, in a method of operating a control system for a motor vehicle in which the control system has a control unit connected via at least one signal line with the electrically-operable or controllable vehicle components including effectors for electrically operating such components as the vehicle door locks, closures for at least one privacy zone and the like.

According to the invention, the control device is selectably operable by the user (a) either in a normal operation mode in which all vehicle components connected to the control unit are operable by the respective electrical service elements or effectors, or (b) in a work facility operating mode in which only the closures for the privacy zones cannot be brought into their "open" functional positions by the respective electrical service elements or effectors while all other electrical service elements or effectors can operate as in the normal mode.

The invention is based upon our discovery that, with an electrical control system of the type described, especially with a program-controlled system, i.e. a system having at least one processor, without any additional mechanical structure it is easy to establish normal and service facilities operating modes which can be differentiated from one another and selected between. Especially, it is not required to allow the closures for the personal zones to be opened in the service facility operation mode and this can be achieved without equipping those closures with additional locking cylinders or special locking cylinders.

When reference is made herein to a normal operating mode, it will be understood that all of the usual functions can be achieved by the control element via the respective electrical service elements or effectors.

A service facility operation mode means that the closures for the privacy zones, i.e. those areas in which personal belongings are stored, are deactivated in the "closed" functional state and cannot be brought into the "open" functional state as long as the service facility operating mode is maintained. In the service facility operating mode, however, all of the other functions of the electrically-operated components may be performed. The deactivation of the closures for the privacy zones can be effected in the simplest case in the form of an electrical locking function. When the respective locks have been lodged closed electrically, this function can include a disconnection of the lock from the current supply line so that the closures are blocked in the closed positions. This can also be achieved by simply blocking the satellite processors controlling the effectors or electric motors which would normally open the locks to the privacy zones.

The selection between the normal operation mode and the service facility operation mode can be effected by inputting a code number into the control unit via coding keys connected therewith. This inputted code number can be compared with an identity code number stored in an identity code memory of the control unit. For activation and resetting to the normal mode and as a consequence enabling activation of the locks of the privacy zones, the appropriate code can be inputted after the vehicle has left the service facility. Alternatively, the return to the normal operating mode can be effected automatically upon the laps of a predetermined time period which commences upon setting of the unit into the service facility mode.

According to a feature of the invention, the identity code number can be inputted by a service person by means of the coding keys of he control unit. Advantageously, prior to storing a new identity code number, a code number must be inputted to activate the memory in the control unit by means of the code keys and the new identity code number is stored only with an inputted code number agreeing with the previously stored identity code number.

Alternatively, the identity code number can be permanent for the particular vehicle and supplied at the time that the vehicle is constructed. It is also possible upon construction to set the identity code number to zeroes, allowing a new identity code number to be selected by the vehicle purchaser. The code number length can correspond preferably to three decimal places.

In the case in which an authorized person forgets the identity code number which is required to reset the control unit from the service facility operation, the control unit can be provided with a timing circuit integrated therein which can automatically deactivate the service facility operation mode after a fixed time period which can approximate the duration with which a vehicle can be expected to be in the service facility and restore the normal operating mode. This ensures that after the vehicle has left the service facility, the operator or user will have access to personal belongings stored in the privacy zones. When the identity code number is intended to be set by service personnel, it may be advantageous to deactivate the setting system following a given time interval and to reset the stored code number, for example, to zeroes, thereby enabling a new identity code number to be stored only at the next visit to a service facility.

Furthermore, the control unit can be programmed to respond to a certain code word which can be made available by the manufacturer of the vehicle to which, for example, all of the locking systems can respond, to enable a new code word or number to be set therein as the identity code.

According to another feature of the invention, simultaneously with the inputted of an identity code number via the coding keys or buttons, a blocking time is programmed into the control unit which can be individual to the particular vehicle or selected as need arises, and the blocking time can automatically terminate upon its lapse. During the blocking time that identity code remains effective but the identity code can be reset to zeroes or simply extinguished upon the lapse of the blocking period. In that case, the user need not remember the code for any extended period of time, the code being applicable only for the particular visit.

The method of the invention in its broadest aspects, then comprises the steps of:

(a) setting the control unit for a normal operation mode and, in the normal operation mode, transmitting signals from the control unit to all of the controlled units for operation of all of the locks through the electrical control system; and (b) setting the control unit for a service-facility operation mode preventing opening of the at least one lock of the privacy zone and, in the service-facility operation mode, transmitting signals from the control unit to all of the controlled units other than the controlled unit of the lock of the privacy zone for operation of all of the locks through the electrical control system other than the lock of the privacy zone.

In apparatus terms the control system can comprise:

a plurality of door locks and at least one lock for a privacy zone which can contain personal belongings, the system comprising a control unit provided with a plurality of electrical actuators and coding keys;

at least one signal line connected to the control unit and to the locks whereby, in a normal mode, the actuators operate all of the locks; and coding means connected to the central unit for switching the system to a service facility operating mode upon inputting of a certain code, thereby inactivating the lock of the privacy zone while enabling operation of the remaining locks by the actuators.

According to this aspect of the invention, the control system thus comprises a control unit connected by at least one signal line with the controlled units which can include the electrically driven vehicle components mentioned earlier, each of which has a server responding to the signal. The electrically-controllable units include at least the vehicle door locks and one lock for the privacy zone of the vehicle, the latter lock being deactivated to remain in its "closed" position or mode upon inputting to the control unit through the coding keys of an appropriate code which allows the vehicle door locks to remain functional.

According to a feature of the invention, the control unit thus comprises the aforementioned memory and a plurality of code keys whereby the code number can be introduced into the control unit to allow the lock or locks for the privacy zone or zones to be deactivated by comparison of an inputted code number with a stored identity code number.

The control unit has the timing circuit also previously mentioned for automatically reactivating the lock or locks of the privacy zone or zones, after the passage of a predetermined time period subsequent to the deactivation thereof.

BRIEF DESCRIPTION OF THE DRAWING

The above and other objects, features, and advantages will become more readily apparent from the following description, reference being made to the sole FIGURE of which is a diagram of an automotive vehicle with a control system according to the invention.

SPECIFIC DESCRIPTION

In the sole FIGURE of the drawing, we have shown an automotive vehicle 1 provided with a control unit 2 connected via a multiplex single conductor bus 3 to a multiplicity of electrically-operated vehicle components such as door locks 5 which can have satellite processors responsive to the signals transmitted along the bus 3 from the control unit central processor for operation of the door locks.

The system can comprise a multiplicity of actuators 4, which can be operating buttons, which selectively can operate the various components.

The electrically-operated components can include locks 6 for the privacy zones 7 of the motor vehicle, these privacy zones being, for example, a storage console between the driver's seat 11 and the passenger seat 12 of the vehicle, the storage console being represented as a whole at 13 and the trunk 14 of the vehicle located at the rear thereof.

The control device 2 also comprises coding buttons 8 which can be provided for the control unit 2 which has an identity code memory or storage 9 and a timing circuit 10 connected to the central processor 15. Another closure 6 for a privacy space 7 can be provided for the glove compartment 16 of the vehicle.

The control unit is so designed that the closure 6 for the privacy zones 7 can be deactivated in the "closed" states by operation of the coding keys 8. According to the invention, the input of a code results in a comparison in the processor 15 of the inputted code number with the identity code previously stored in memory 9 whereupon, with such an identity, the control unit 2 is switched over to a service facility mode in which the closures 6 are inactivated in their closed states while the doors 5 can continue to be operated by actuation of the buttons 4.

Upon inactivation of the closure 6, a time period is set to run in the clock 10 for automatic reactivation of the lock 6 after the lapse of a time period set in the clock 6. This time period can be, for example, three days and is chosen to correspond to the average duration of a vehicle in a service facility.

The control device can be set, therefore, by the vehicle owner or a service person to operate either in a normal mode in which all of the vehicle components 5 and 6 connected to the control device can be operated by the elements 4, or in the service facility operating mode in which only the closure 6 for the privacy spaces are locked out from operation by the actuators 4, i.e. cannot be brought to their open conditions by the operation of the actuators.

The identity code can, as has been noted, be stored in the memory 9 upon fabrication of the vehicle and cannot be altered thereafter in one embodiment of the invention. The inactive state or service facility mode may be terminated and the control system switched back to the normal mode automatically upon the lapse of the predetermined time period.

We claim:

1. A method of operating an electrical control system for a motor vehicle, the electrical control system having a control unit connected by a signal-transmission line to respective controlled units connected to respective electrically operated components including motor vehicle door locks and at least one lock for a privacy zone of the vehicle, said method comprising the steps of:

(a) setting said control unit for a normal operation mode and, in said normal operation mode, transmitting signals from said control unit to all of said controlled units for operation of all of said locks through said electrical control system;

(b) setting said control unit for a service-facility operation mode preventing opening of said at least one lock of said privacy zone and, in said service-facility operation mode, transmitting signals from said control unit to all of said controlled units other than the controlled unit of said lock of said privacy zone for operation of all of said locks through said electrical control system other than the lock of said privacy zone; and (c) automatically in response to a timer circuit switching from said service-facility mode back to said normal operation mode upon lapse of a predetermined time period of the order of days corresponding to a vehicle-servicing period.

2. The method defined in claim 1 wherein said control unit is set to said service-facility operation mode by inputting a code number into said control unit by actuation of code buttons, comparing the inputted code number with an identification code number stored in an identification code memory of said control unit, and setting said service-facility operation mode upon agreement of the compared code numbers.

3. The method defined in claim 2 wherein said identification code number is stored by operation of said code buttons by a service person.

4. The method defined in claim 3 wherein, to store a new identity code in said memory, a code number corresponding to a previously stored identity code number is inputted and compared with the previously stored identity code number, and, upon agreement of the inputted code number with the previously stored code number, a new identity code is stored in said memory using said buttons.

5. The method defined in claim 1 wherein said identity code number is stored in the memory at fabrication of the vehicle and remains unchanged thereafter.

6. A control system for an automotive vehicle having a plurality of door locks and at least one lock for a privacy zone which can contain personal belongings, said system comprising a control unit provided with a plurality of electrical actuators and coding keys;

at least one signal line connected to said control unit and to said locks whereby, in a normal mode, said actuators operate all of said locks coding means connected to said control unit for switching said system to a service facility operating mode upon inputting of a certain code, thereby inactivating said lock of said privacy zone while enabling operation of the remaining lock by said actuators; and a timing circuit setting a time period of the order of days corresponding to a vehicle-servicing time upon switching of said system to said service facility mode and automatically reactivating said lock of said privacy zone upon the lapse of said time period.

7. The system defined in claim 6 wherein said control unit includes an identity code memory storing an identity code, said control unit including means for comparing a code input by said coding means with said identity code for switching to said service facility mode upon agreement of an inputted code with said identity code stored in said memory.

* * * * *